(12) United States Patent
Wang et al.

(10) Patent No.: US 8,665,708 B2
(45) Date of Patent: Mar. 4, 2014

(54) METHOD AND APPARATUS FOR A RING NETWORK NODE TO ACQUIRE PROTOCOL MESSAGES

(75) Inventors: Bin Wang, Shenzhen (CN); Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 133 days.

(21) Appl. No.: 13/390,773

(22) PCT Filed: Jan. 27, 2010

(86) PCT No.: PCT/CN2010/070387
§ 371 (c)(1),
(2), (4) Date: Feb. 16, 2012

(87) PCT Pub. No.: WO2011/022956
PCT Pub. Date: Mar. 3, 2011

(65) Prior Publication Data
US 2012/0147735 A1 Jun. 14, 2012

(30) Foreign Application Priority Data
Aug. 31, 2009 (CN) .......................... 2009 1 0169680

(51) Int. Cl.
*H04J 1/16* (2006.01)
(52) U.S. Cl.
USPC ........... 370/222; 370/216; 370/217; 370/452; 370/462
(58) Field of Classification Search
USPC ......... 370/351–356, 404, 405, 406, 460, 462, 370/452
See application file for complete search history.

(56) References Cited

U.S. PATENT DOCUMENTS

| 2008/0107416 A1* | 5/2008 | Wang | 398/59 |
| 2010/0135291 A1* | 6/2010 | Martin et al. | 370/389 |

FOREIGN PATENT DOCUMENTS

| CN | 101141333 A | 3/2008 |
| JP | 2005520398 A | 7/2005 |
| JP | 2006526323 A | 11/2006 |
| JP | 2007522691 A | 8/2007 |
| KR | 20040021030 A | 3/2004 |
| KR | 20080071595 A | 8/2008 |

OTHER PUBLICATIONS

ITU-T G.8032/Y.1344 Ethernet ring protection switching, Telecommunication Standardization Sector of ITU.
International Search Report for PCT/CN2010/070387 dated May 5, 2010.

* cited by examiner

*Primary Examiner* — Kibrom T Hailu
*Assistant Examiner* — Zewdu A Beyen
(74) *Attorney, Agent, or Firm* — Ling Wu; Stephen Yang; Ling and Yang Intellectual Property (57) ABSTRACT

The present invention provides a method and an apparatus for acquiring protocol messages by a ring-network node, including: using dual fields to identify different protocol messages; if a node supporting G.8032v1 receives a Force Switch (FS) or Manual Switch (MS) protocol message, determining that message is a Signal Fail (SF) protocol message according to an identifier; a node supporting G.8032v2 determining that the received protocol message is an SF or MS or FS protocol message according to the identifier. The method of the present invention enables the nodes in a ring network to accurately control the state of their own ports, thereby avoiding the case that multiple blocking points appear in the ring network and improving the network performance.

4 Claims, 7 Drawing Sheets

METHOD AND APPARATUS FOR A RING NETWORK NODE TO ACQUIRE PROTOCOL MESSAGES

TECHNICAL FIELD

The present invention relates to ring-network protection technology, more specifically, to a method and an apparatus for acquiring a protocol message by a ring-network node.

BACKGROUND OF THE RELATED ART

With the Ethernet developing towards the direction of multi-service carrying, especially, a plurality of services with higher and higher requirements for reliability and real time of the network, ring networking is widely deployed in Ethernet to enhance reliability of the network. In the network protection methods for ring networks, rapid (less than 50 ms) protection switching is usually required. Currently, rapid protection switching technology includes RFC3619 of Internet Engineering Task Force (IETF), and G.8032 of the International Telecommunication Union (ITU-T), etc.

Figure 1:
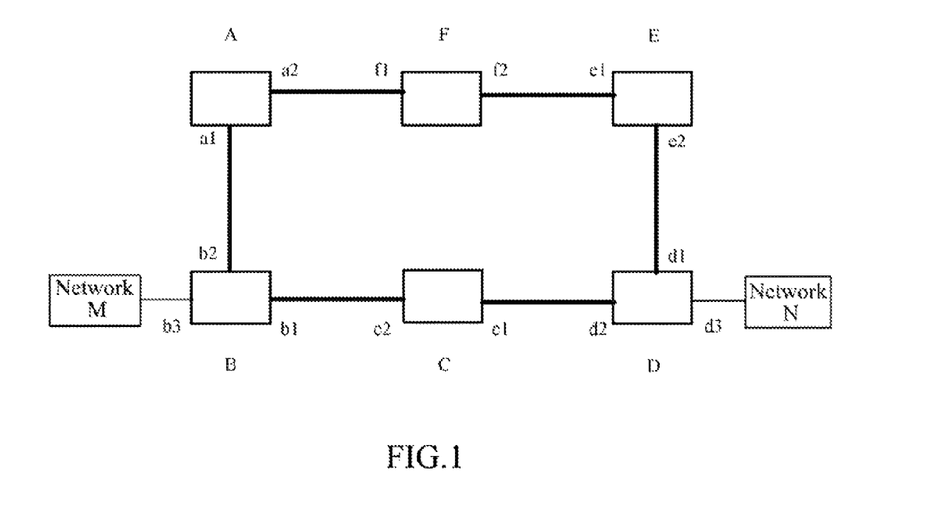
FIG. 1 is a structure diagram of the Ethernet ring in the related art.

Take Ethernet ring protection technology as an example, and FIG. 1 shows a structure diagram of the Ethernet ring in the related art. As shown in FIG. 1, node A~node F are nodes that have Ethernet switching functions; network NI connects to node B; network N connects to node D. Network M and network N communicate via two physical paths, i.e., network N←→node D←→node C←→node B←→network M, or network N←→node D←→node F←→node F←→node A←→node B←→network M.

Ethernet ring protection technology defines a ring protection link and a control node, that is, in a case of an Ethernet ring without a failure, the link on the ring blocking the data message for preventing the ring being formed is called as the ring protection link, and the switching between the active link and the protection link on the ring network is achieved by operating the ring protection link. The node with the ring protection link is called as a control node (or a master node).

Figure 2A:
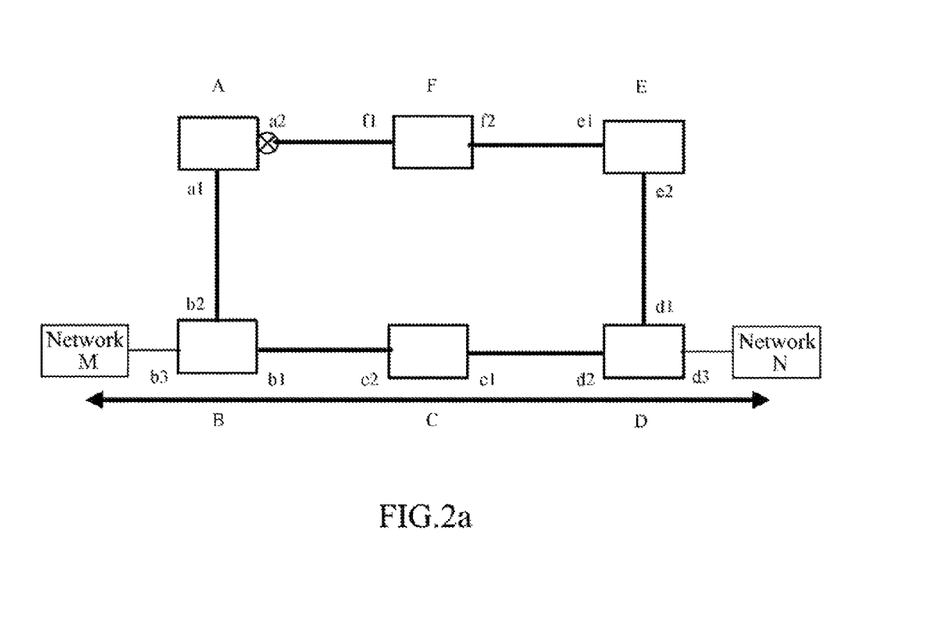
FIG. 2a is a schematic diagram of forwarding the data stream in a case of an Ethernet ring shown in FIG. 1 without a failure.

FIG. 2a is a schematic diagram of forwarding the data stream by an Ethernet ring shove in FIG. 1 without a failure. As shown in FIG. 2a, the ring network comprises nodes A, B, C, E, and F, and links <A,B>, <B,C>, <C,D>, <D,E>, <E,F>, <F,A>. Suppose node A is the control node, and the direct link <F,A> connecting to port a2 is the ring protection link.

When there is not a failure on links of the ring, the control node blocks the data message-forwarding function of the port a2 that connects to the ring protection link, and thus a loop is not formed in the network, which prevents broadcast storms caused by the network loops. As shown in FIG. 2a, the control node A blocks the protection data message-forwarding function of the port a2. The communication path between network M and network N is: network M←→node B←→node C←→node D←→network N.

Figure 2B:
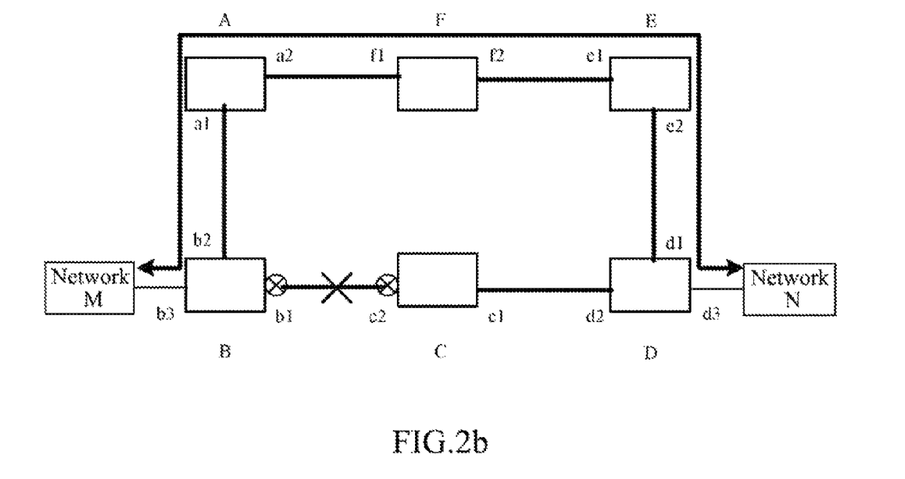
FIG. 2b is a schematic diagram of data stream protection switching in a case of an Ethernet ring shown in FIG. 1 with a failure.

When a failure occurs on the link, the control node A opens the data message-forwarding function on the port a2 that connects to the ring protection link, thereby ensuring service connectivity. FIG. 2b is the schematic diagram of data stream protection switching under a case of the Ethernet ring with a failure. As shown in FIG. 2b, suppose the link <B,C> on the ring has a failure, the control node A opens (enables) the data message-forwarding function on the port a2, and then the new communication path between network M and network N is: network M←→node B←→node A←→node F←→node E←→node D←→network N.

ITU-T G.8032 version 1 (G.8032v1) has been released in June, 2008. In this version, the standard supports two types of protocol messages: the SF protocol message and the NR protocol message. The two types of protocol messages are respectively described as follows.

The SF protocol message is the Signal Fail (SF) message, and its functions are: when a node detects a failure, the node periodically sends the SF protocol message along the ports on the ring to notify other nodes on the ring that a failure occurs on the ring network. After receiving the SF message, the nodes on the ring that have blocking ports (the ports without a failure that block data messages) enable the data message-forwarding function of the blocking ports.

The NR protocol message is the No Request message, and its functions mainly have the following two aspects:

when detecting that the failure on the adjacent link recovers, the node periodically sends the NR message along the two ports on the ring to notify other nodes on the ring that the link failure recovers.

After receiving NR messages sent by other nodes, the control node starts a Waiting Timer (WTR timer). When the WTR timer times out, the control node blocks the data-forwarding function of the ports, and periodically sends the NR (RB) message (RB: RPL Link Blocked) along the two ports on the ring to notify other nodes on the ring that the ring protection link has been blocked.

After releasing ITU-T G.8032v1, ITU-T SG15 group started to draft G.8032 version 2 (G.8032v2). In the standard of G.8032v2, two types of protocol messages are increased based on G.8032v1: Force Switch (FS) and Manual Switch (MS) protocol messages. These two types of protocol messages are both the method for artificially making the blocking ports on a ring. That is, when node on a ring starts FS (or MS), the node periodically sends the FS (or MS) message along the two ports on the ring to notify other nodes on the ring that a force switch (or a manual switch) occurs. After receiving the FS (or MS) message, the nodes on the ring that have blocking ports (the ports without a failure that block data messages) enable the data message-forwarding function of the blocking ports. The difference between FS and MS is that the priority of FS is higher than that of SF and the priority of MS is lower than that of SF, which means when the ring network has a failure, FS protocol messages can exist in the ring network, while MS protocol messages will be refused by the nodes in the ring network.

A 4-bit Request/State field is adopted to identify the type of a protocol message in the protocol message of ITU-T G.8032v1. The code values of SF and NR in this field are shown in Table 1.

TABLE 1

| Field | Protocol message code value | Message description |
|---|---|---|
| Request/State | 0000 | NR |
|  | 1011 | SF |
|  | Others | Reserved |

A 4-bit Request/State field is adopted to identify the type of a protocol message in the protocol message of ITU-T G.8032v2. The code values of SF, NR, MS and FS in this field are shown in Table 2.

TABLE 2

| Field | Protocol message code value | Message description |
|---|---|---|
| Request/State | 0000 | NR |
|  | 1011 | SF |

TABLE 2-continued

| Field | Protocol message code value | Message description |
|---|---|---|
| | 0111 | MS |
| | 1101 | FS |
| | 1110 | Event |
| | Others | Reserved |

When Request/State field=1110 (Event), new types of protocol messages may be defined combined with Sub-code field, as shown in Table 3.

TABLE 3

| Request/State (code) | Sub-code (code) | Message description |
|---|---|---|
| 1110 | 0000 | Flush |
| | Others | Reserved |

The Flush message in Table 3 is mainly used for address refresh outside sub-ring domain in multi-ring scenarios. The details refer to the ITU-T G.8032v2 standard. Here the description about will be not repeated.

Currently, protocol messages of G.8032v1 and G.8032v2 are distinguished by the Version field. The value of the Version field in G.8032v1 protocol messages is 0x00, and that in G.8032v2 protocol messages is 0x01.

At present, the method for implementing forward compatibility of G.8032v2 (compatible with G.8032v1) includes:

1) when a node only supports the G.8032v1 version, the node filters out the FS and MS protocol packets, and only forwards ES and MS protocol messages without further processing;

2) when a node supports the G.8032v2 version, the node can recognize FS and MS protocol messages, and processes the FS and MS protocol messages accordingly.

Figure 3A:
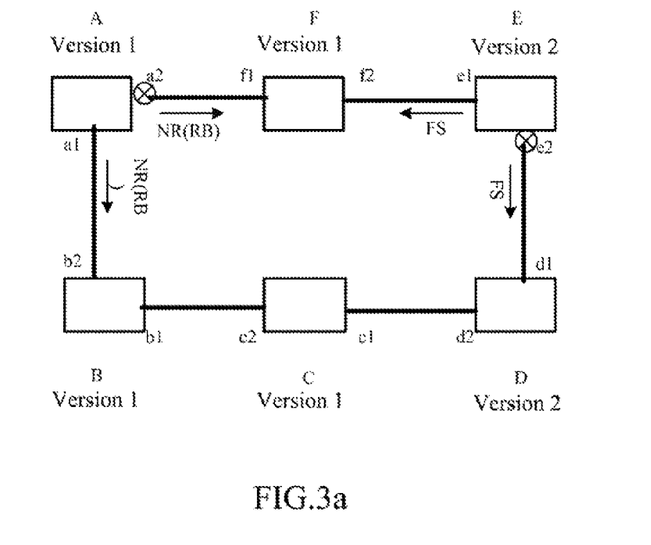
FIG. 3a is the first schematic diagram of a compatibility problem existing in the existing ring network.
Figure 3B:
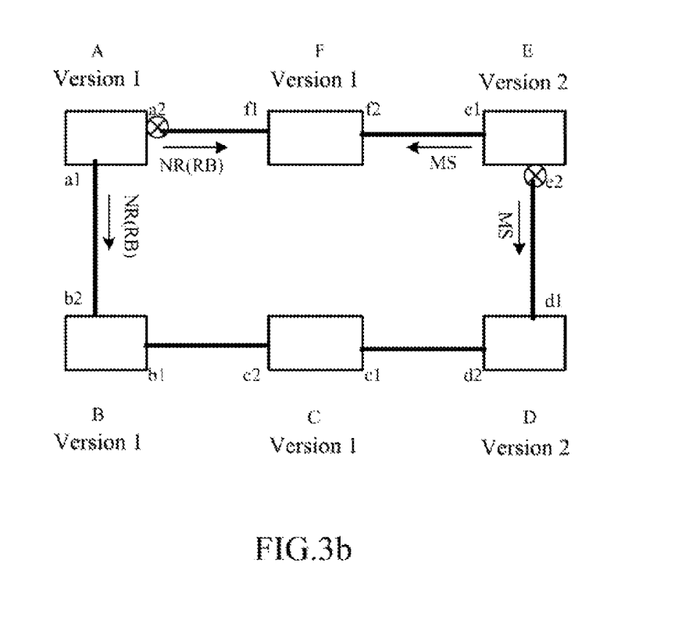
FIG. 3b is the second schematic diagram of a compatibility problem existing in the existing ring network.

However, in the present compatibility solutions, problems may exist under a plurality of cases. FIG. 3a and FIG. 3b respectively are the first schematic diagram and the second schematic diagram showing the compatibility problems existing in the existing ring networks. Details are as follows.

As shown in FIG. 3a, suppose that nodes A, B, C and F support ITU-T G.8032v1 and nodes D and E support ITU-T G.8032v2; and node A is the control node. When no failure occurs in the ring network, node A blocks the data message-forwarding function of port a2 and periodically sends NR (RB) messages along the two ports on the ring at the same time.

When force switch is started at port e2 of node E in the system, node E periodically sends FS protocol messages along port e1 and port e2 outwards. Since nodes A, B, C and F support ITU-T G.8032v1, they filter out the received FS protocol messages and do not perform further processing, and therefore, node A does not enable the data message-forwarding function of port a2 after receiving the FS messages, and two blocking ports always exist on the ring, which dramatically decreases the network performance.

Similarly, in FIG. 3b, since the control node A supports ITU-T G.8032v1, it only filters out the MS protocol messages sent by node F and does not perform further processing. Therefore, node A does not enable the data message-forwarding function of port a2 after receiving the MS messages, and two blocking ports always exist on the ring, which dramatically decreases the network performance.

In conclusion, the existing forward compatibility solutions of ITU-T G.8032v2 cause a case that multiple block points occurs in the ring network, which dramatically decreases the network performance.

SUMMARY OF THE INVENTION

In view of this, the main object of the present invention is to provide a method and an apparatus for acquiring a protocol message by a ring-network node, which can improve the network performance.

In order to achieve the object, the technical scheme of the present invention is implemented as follows.

A method for acquiring a protocol message by a ring-network node comprises:

using dual fields to identify a Signal Fail (SF) protocol message; a Manual Switch (MS) protocol message and a Force Switch (FS) protocol message; and if a node supporting G.8032v1 receives an ES or MS protocol message, determining that the message is an SF protocol message according to an identifier; and a node supporting G.8032v2 determining that the received protocol message is an SF or MS or ES protocol message according to the identifier.

The step of using dual fields to identify SF, MS and FS protocol messages comprises:

using a code value in a Request/State field to identify that a protocol message belongs to a type of SF, MS and FS protocol messages, and then using different code values in a sub-code field to respectively identify SF, MS and ES protocol messages.

When the code value in the Request/State field is 1011 and the code value in the sub-code field is 0000, the received protocol message is the SF protocol message;

when the code value in the Request/State field is 1011 and the code value in the sub-code field is 0001, the received protocol message is the MS protocol message;

when the code value in the Request/State field is 1011 and the code value in the sub-code field is 0010, the received protocol message is the ES protocol message.

An apparatus for acquiring a protocol message by a ring-network node comprising a configuration module and an identification module, wherein the configuration module is used to: configure code values of dual fields for identifying SF, MS and FS protocol messages;

the identification module is used to: receive a protocol message and identify the received protocol message according to a configuration result obtained from the configuration module.

The apparatus is set in an Ethernet ring node.

From the technical solutions provided above in the present invention, different protocol messages are identified by using dual fields; when a node supporting G.8032v1 receives an FS or MS protocol message, it determines that the message is an SF protocol message and processes accordingly; a node supporting G.8032v2 processes accordingly on SF or MS or FS protocol messages received according to the identifier. The method of the present invention enables the nodes on a ring to accurately control the state of their respective ports, thus avoiding the situation that multiple block points appear on the ring and improving the network performance.

PREFERRED EMBODIMENTS OF THE PRESENT INVENTION

Figure 4:
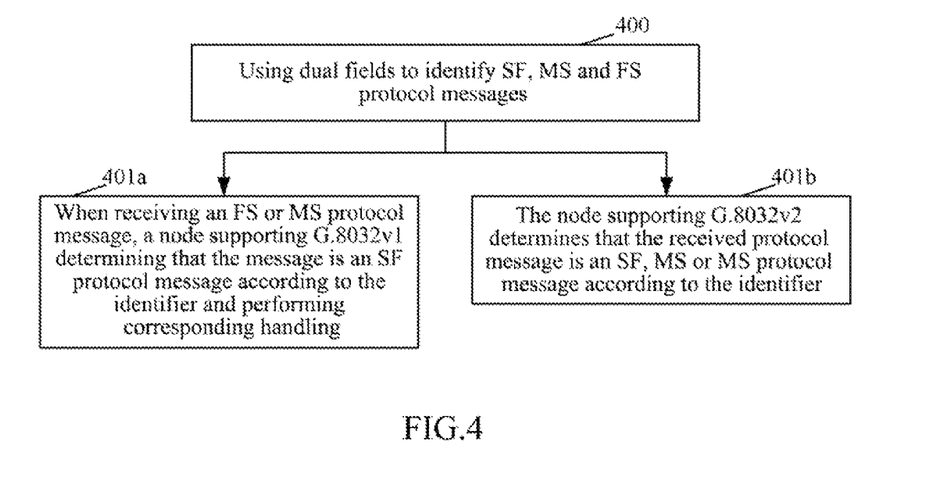
FIG. 4 is a flowchart of a method for acquiring protocol messages by a ring network node according to the present invention.

FIG. 4 is a flowchart of a method for acquiring protocol messages by a ring network node according to the present invention. As shown in FIG. 4, the method comprises following steps.

Step 400: dual fields are used to identify SF, MS and FS protocol messages.

In this step, the type codes of SF, MS and FS protocol messages may be identified by two fields of the Request/State field and Sub-code field. The code value in the Request/State field identifies that a protocol message belongs to the type of SF, MS and FS protocol messages, and then different code values in Sub-code field identify SF, MS and ES protocol messages, as shown in Table 4:

TABLE 4

| Request/State (code) | Sub-code (code) | Message description |
| --- | --- | --- |
| 1011 (the code is the same as that of the SF in the v1 version) | 0000 | SF |
| | 0001 | MS |
| | 0010 | FS |
| | Others | Reserved |

As Request/State field=1011 and sub-code field=0000, the message is an SE protocol message;

as Request/State field=1011 and sub-code field=0001, the message is an MS protocol message;

as Request/State field=1011 and sub-code field=0010, the message is an FS protocol message.

Step 401a: a node supporting G.8032v1 receives an FS or MS protocol message and then determines that it is an SF protocol message.

If the node only supports G.8032v1, it interprets the received FS or MS protocol message as an SF protocol message, which means it ignores the sub-code field. Then the node performs further processing based on the SF protocol message.

It should be noted that when a node that only supports G.8032v1 version and receives an SF message, it performs the message as the existing methods.

Step 401b: a node supporting G.8032v2 determines the received protocol message as an SF, MS or MS protocol message based on the identifier.

When a node supports G.8032v2, it identifies the SF, FS or MS protocol message based on the Request/State field and sub-code field, and then processes the received protocol message accordingly.

With the method of the present invention, the nodes on the ring network are able to accurately control the state of its ports, thereby avoiding the case that multiple blocking points appear in the ring network and improving the network performance.

Figure 5:
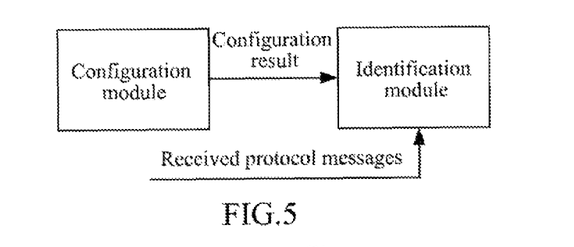
FIG. 5 is a structure diagram of an apparatus for acquiring protocol messages by a ring network node according to the present invention.

FIG. 5 is a schematic diagram of an apparatus for acquiring protocol messages by a ring network node according to the present invention. As shown in FIG. 5, the apparatus of the present invention is configured in the node, and comprises a configuration module and an identification module, wherein the configuration module is used to configure the code values of the dual fields for identifying SF, MS and ES protocol messages. The configuration result is shown in Table 4, which will be not repeated herein.

The identification module is used to receive protocol messages and identify the received protocol messages according to the configuration result obtained from the configuration module.

Figure 6:
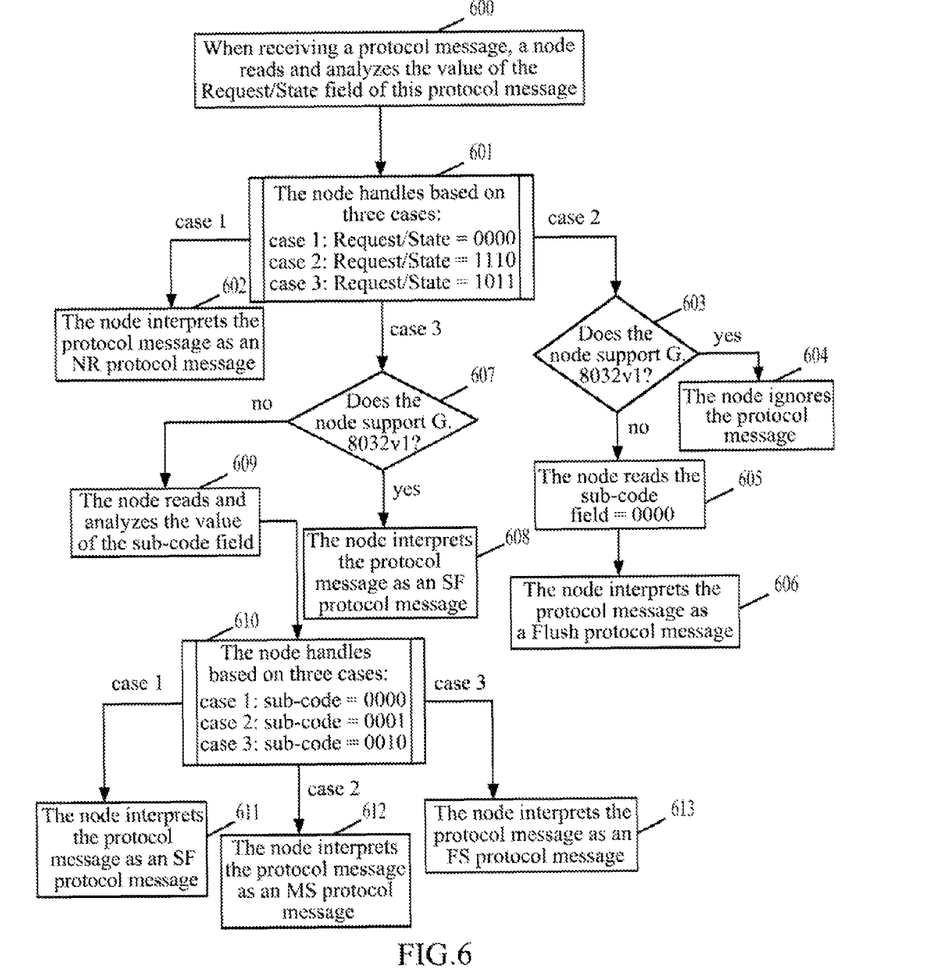
FIG. 6 is a flowchart of a method for acquiring protocol messages by a ring network ode according to an embodiment of the present invention.

FIG. 6 is a flowchart of a method for acquiring protocol messages by a ring network node according to an embodiment of the present invention. The method comprises followings steps.

Step 600: when receiving a protocol message, a node reads the value of the Request/State field of this protocol message.

Step 601: the node handles the protocol message from three cases according to the value of the Request/State field, including: case 1: when Request/State=0000, step 602 is performed; case 2: when Request/State=1110, step 603 is performed; case 3: when Request/State=1011, step 607 is performed.

Step 602: the node interprets the protocol message as an NR protocol message. The procedure ends.

Step 603: whether the node supports G.8032v1 or G.8032v2 is judged. If the node only supports G.8032v1, step 604 is performed, otherwise step 605 is performed.

Step 604: the node only forwards the received protocol message and ignores this protocol message. The procedure ends.

Step 605: the node further reads the sub-code field, and if sub-code=0000, step 606 is performed.

Step 606: the node interprets the protocol message as a Flush protocol message. The procedure ends.

Step 607: whether the node supports G.8032v1 or G.8032v2 is judged. If the node only supports G.8032v1, step 608 is performed, otherwise step 609 is performed.

Step 608: the node interprets the protocol message as an SF protocol message. The procedure ends.

Steps 609~610: the node further reads and analyzes the value of the sub-code field, and then handles the protocol message from three cases: case 1: when sub-code=0000, step 611 is performed; case 2: when sub-code=0001, step 612 is performed; case 3: when sub-code=0010, step 613 is performed.

Step 611: the node interprets the protocol message as an SF protocol message. The procedure ends.

Step 612: the node interprets protocol message as an MS protocol message. The procedure ends.

Step 613: the node interprets the protocol message as an ES protocol message. The procedure ends.

The following illustrates the methods of the present invention in detail in combination with the structure diagram of the ring network.

The first embodiment illustrates the case that force switch occurs.

Figure 7A:
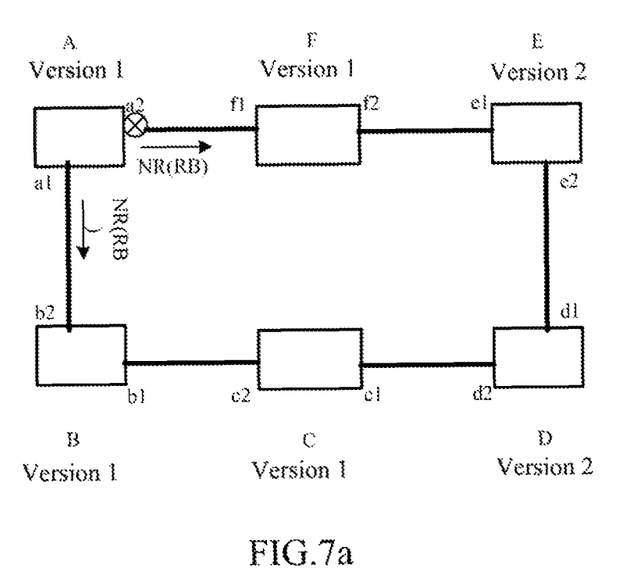
FIG. 7a is a schematic diagram of acquiring NR (RB) protocol messages in the case that force switch occurs in the ring network according to the first embodiment of the present invention.

FIG. 7a, is a schematic diagram of acquiring NR (RB) protocol messages in the case that force switch occurs in the ring network according to the first embodiment of the present invention. As shown in FIG. 7a, nodes A, B, C and F are the nodes that only support ITU-T G.8032v1, nodes D and E are the nodes that support G.8032v2, and node A is the control node. In a case of an Ethernet ring without a failure, node A blocks the data message-forwarding function of port a2, and periodically sends NR (RB) protocol messages along the two ports on the ring at the same time.

Figure 7B:
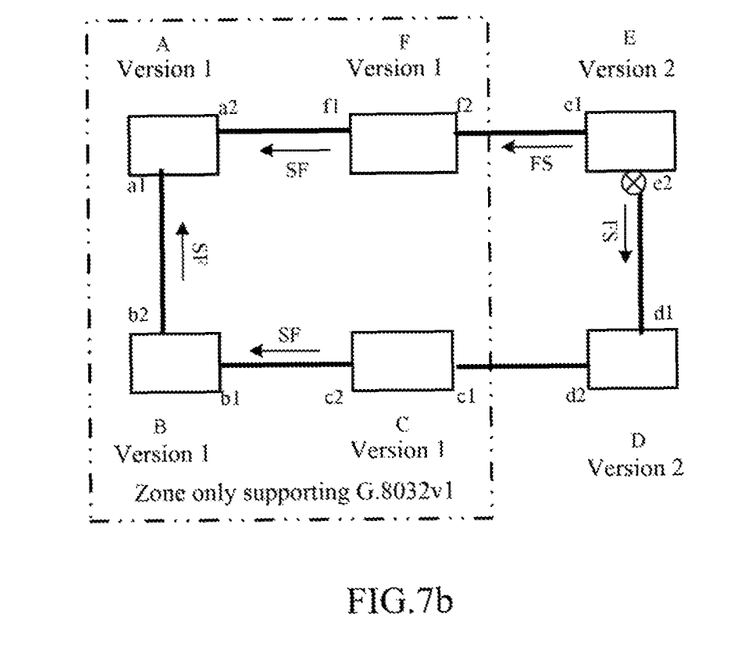
FIG. 7b is a schematic diagram of acquiring FS protocol messages when force switch is started in the case that force switch occurs in the ring network according to the first embodiment of the present invention.

FIG. 7b is a schematic diagram of acquiring FS protocol messages when force switch is started in the case that force switch occurs in the ring network according to the first embodiment of the present invention. As shown in FIG. 7b, suppose that when the system starts force switch on port e2 of node E, node E periodically sends ES protocol message along port e1 and port e2 outwards. Since nodes A, B, C and F are the nodes that only support ITU-T G.8032v1, when receiving the FS protocol message, they only read the value, i.e., 1011, of the Request/State field in the protocol message and ignore the sub-code field, and thus these nodes interpret the ES protocol message as an SF message and refresh their address-forwarding table. Node A also enables the data message-forwarding function on port a2 after interpreting the received ES protocol message as an SF message, thereby avoiding the case that multiple blocking points appear in the ring network and improving the network performance.

The second embodiment illustrates the case that manual switch occurs.

Figure 8A:
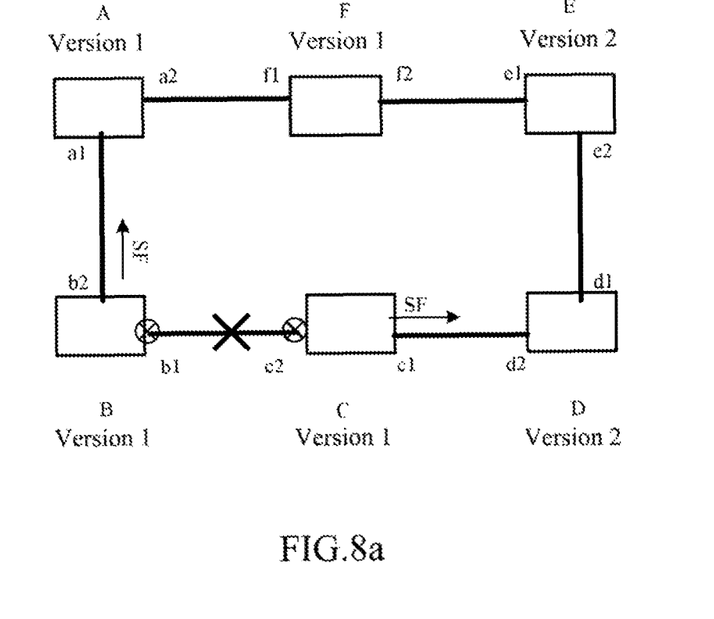
FIG. 8a is a schematic diagram of acquiring SF protocol messages in the case that manual switch occurs in the ring network according to the second embodiment of the present invention.

FIG. 8a is a schematic diagram of acquiring SF protocol messages in the case that manual switch occurs in the ring network according to the second embodiment of the present invention. As shown in FIG. 8a, suppose that node B and node C detect that <B,C> link has a failure, node B and node C respectively block the data-forwarding function of port and port c2, refresh respective address-forwarding tables, and periodically send SF protocol messages along their working ports on the ring. Other nodes on the ring also refresh the address-forwarding table after receiving the SF protocol messages. Control node A also enables the data-forwarding function of port a2.

Figure 8B:
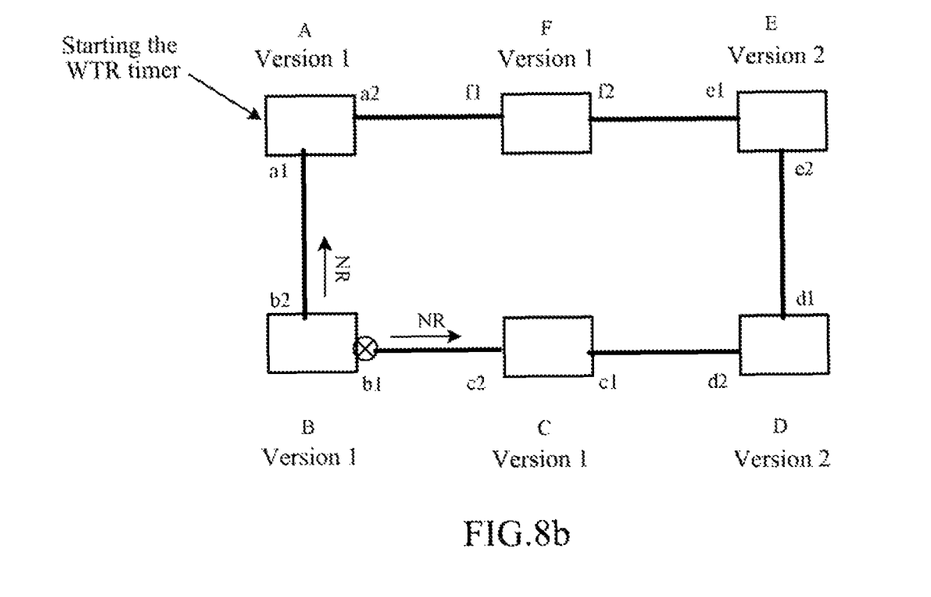
FIG. 8b is a schematic diagram of acquiring NR protocol messages in the case that manual switch occurs in the ring network according to the second embodiment of the present invention.

FIG. 8b is a schematic diagram of acquiring NR protocol messages in the case that manual switch occurs in the ring network according to the second embodiment of the present invention. As shown in FIG. 8b, suppose that node B and node C detect that the failure of <B,C> link recovers, node B and node C periodically send NR protocol messages along the ports on the ring respectively. When node C receives the NR protocol message sent by node B and discovers that the node number (Node_ID) in the message is greater than the node number of the node C itself, then node C stops sending the NR protocol message, and enables the data-forwarding function of port c2 (node B continues to block port b1). After receiving the NR protocol message, the control node A starts the WTR timer.

Figure 8C:
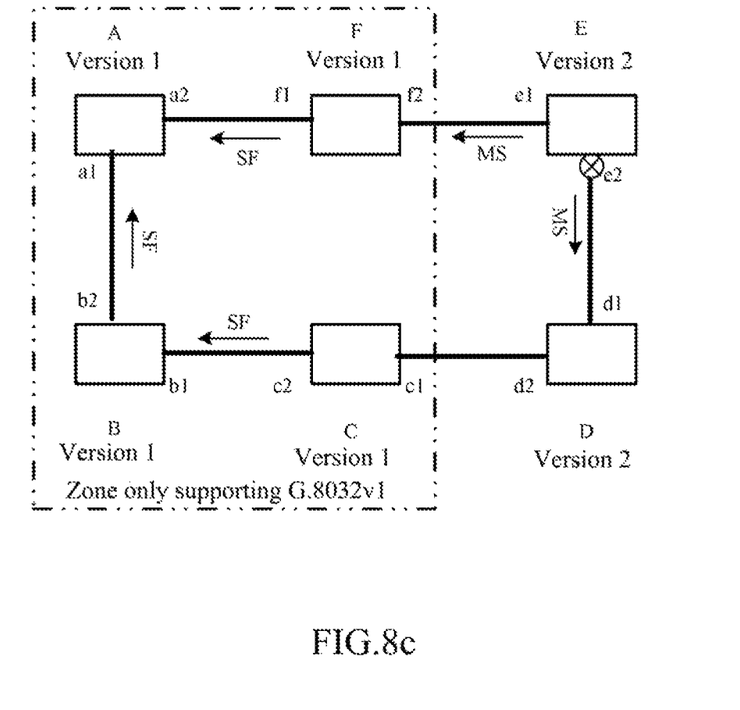
FIG. 8c is a schematic diagram of acquiring MS protocol messages in the case that manual switch occurs in the ring network according to the second embodiment of the present invention.

FIG. 8c is a schematic diagram of acquiring MS protocol messages in the case that manual switch occurs in the ring network according to the second embodiment of the present invention. As shown in FIG. 8c, as the WTR timer of the control node A is working, suppose manual switch is started on port e2 of node E, node E periodically sends MS protocol messages along port e1 and port e2 outwards, Since nodes A, B, C and F are the nodes that only support ITU-T G.8032v1, when receiving the MS protocol message, they only read the value 1011 of the Request/State field in the protocol message and ignore the sub-code field, and thus these nodes interpret the received MS protocol message as an SF message. Node B also enables the data message-forwarding function on port b1 after interpreting the received MS protocol message as an SF message.

The above embodiments are only preferred embodiments of the present invention, and they are not intended to limit the present invention. Any modifications, equivalent substitutions, and improvements and so on without departing from the spirit and the principle of the present invention should fall into the protection scope of the present invention.

What is claimed is:

1. A method for acquiring a protocol message by a ring-network node comprising steps of:
   using dual fields to identify a Signal Fail (SF) protocol message, a Manual Switch (MS) protocol message and a Force Switch (FS) protocol message; wherein the step of using dual fields to identify the SF, MS and FS protocol messages comprises: using the code value in a Request/State field to identify the SF, MS and FS protocol message types, and further using different code values in a sub-code field to identify the SF, MS and FS protocol messages respectively;
   when a ring-network node supporting G.8032v1 receives an FS or MS protocol message, the ring-network node ignores the values in the sub-code field and processes the received FS or MS protocol message as a SF protocol message; and
   when a ring-network node supporting G.8032v2 receives an SF, MS or FS protocol message, the ring-network node processes the received SF, MS or FS protocol message as SF, MS or FS protocol message according to the massage types determined based on both code value in the Request/State field and the code value in the sub-code field.

2. The method according to claim 1, wherein the step of using dual fields to identify the SF, MS and FS protocol messages comprises:
   using the code value 1011 in the Request/State field and the code value 0000 in the sub-code field to identify the SF protocol message;
   using the code value 1011 in the Request/State field and the code value 0001 in the sub-code field to identify the MS protocol message; and
   using the code value 1011 in the Request/State field and the code value 0010 in the sub-code field to identify the FS protocol message.

3. An apparatus for acquiring a protocol message of a ring-network node comprising at least one processor, a configuration module and an identification module, wherein the configuration module is used to: configure code values of dual fields for identifying Signal Fail (SF), Manual Switch (MS) and Force Switch (FS) protocol messages, wherein the code value in a Request/State field is used to identify the SF, MS and FS protocol message types, and different code values in a sub-code field are used to further identify the SF, MS and FS protocol messages respectively;

the identification module is used to: receive a protocol message and identify the received protocol message according to a configuration result obtained from the configuration module;

wherein when the apparatus is installed in a ring-network node supporting G.8032v1, when the identification module receives an FS or MS protocol message, the identification module ignores the values in the sub-code field and processes the received FS or MS protocol message as a SF protocol message; and when the apparatus is installed in a ring-network node supporting G.8032v2, when the identification module receives an SF, MS or FS protocol message, said identification module processes the received SF, MS or FS protocol message as SF, MS or FS protocol message according to the massage types determined based on both code value in the Request/State field and the code value in the sub-code field.

4. The apparatus according to claim 3, wherein the apparatus is installed in an Ethernet ring node.

\* \* \* \* \*